United States Patent [11] 3,607,896

| [72] | Inventor | Keith W. Michael |
| | | Midland, Mich. |
| [21] | Appl. No. | 800,731 |
| [22] | Filed | Feb. 19, 1969 |
| [45] | Patented | Sept. 21, 1971 |
| [73] | Assignee | Dow Corning Corporation |
| | | Midland, Mich. |

[54] PREPARATION OF MONO-
HYDROCHLOROSILANES I
6 Claims, No Drawings

| [52] | U.S. Cl. | 260/448.2 E, |
| | | 260/448.2 H |
| [51] | Int. Cl. | C07f 7/08, |
| | | C07f 7/12 |
| [50] | Field of Search | 260/448.2 |
| | | E, 448.2 H |

[56] References Cited
UNITED STATES PATENTS

| Re.25,179 | 5/1962 | Ziegler et al. | 260/448.2 E X |
| 2,857,414 | 10/1958 | Schmidt et al. | 260/448.2 E |
| 3,496,206 | 2/1970 | Berger | 260/448.2 E |
| 3,499,020 | 3/1970 | Robinson | 260/448.2 E |

Primary Examiner—Tobias E. Levow
Assistant Examiner—P. F. Shaver
Attorneys—Robert F. Fleming, Jr., Laurence R. Hobey and Harry D. Dingman ABSTRACT: Chlorosilanes of the formula $R_xSiHCl_{3-x}$ are prepared by reacting $R_xSi(OR')Cl_{3-x}$ with dialkyl aluminum hydrides employing certain ethers such as 1,4-dioxane or dihexyl ethers. There are two variations of the process. One, the ether is present during reaction, in which case, the reaction temperature is in the range from —40° C. to above 25° C. Two, the reaction is carried out at temperature at or below about 25° C. and the ether is then added and the product distilled at temperatures which can be above 25° C.

PREPARATION OF MONO-HYDROCHLOROSILANES I

In the applicant's copending Ser. No. 800,715 entitled "Preparation of Mono-hydrochlorosilanes II" filed concurrently herewith, there is disclosed and claimed a process of preparing mono-hydrochlorosilanes by reacting chloroalkoxysilanes with dialkyl aluminum hydrides in which the reaction and subsequent distillation are both carried out at temperatures at 25° C. or below. In the instant application a way has been found to carry out either the reaction or the distillation, or both at temperatures higher than 25° C. This is accomplished (A) by employing the ethers hereinafter defined during the reaction of the silane with the aluminum hydride, or (b) by reacting the silane with the aluminum hydride at a temperature of 25° C. or below and then adding the ether and thereafter distilling the mixture at a temperature above 25° C. The advantage of using the ether is that one is not limited to low temperature reactions and hence avoids the necessity of excessive cooling or of distillation at reduced pressures.

It is known from U.S. Pat. No. 2,857,414 that halosilanes and alkoxysilanes can be reacted with dialkyl aluminum hydrides to produce silanes having the SiH group. This patent shows that where sufficient hydrogen is present to react with all of the halo or alkoxy groups on the silicon, the products obtained are those having one hydrogen on the silicon for every halo or alkoxy group. The patent also shows that the reaction occurs at temperatures from 20° to 260° C., and the reaction is exothermic. No attempt is made in accordance with the patent to control the temperature during the reaction. Furthermore, the patent makes no distinction between the activity of halogen or silicon and alkoxy on silicon.

Essentially the same reaction is described in French Pat. 1,499,032, published Oct. 20, 1967. In addition, this patent teaches that the reduction of the halo or alkoxysilanes can be accelerated by the use of ethers such as tetrahydrofuran. However, there is no showing in the French patent that there is any difference in the rate of reduction as between alkoxy and halogen atoms on Si. Furthermore, the patent teaches in example 6 that the reaction of 0.1 mol of diphenyldichlorosilane and 0.1 mol of diisobutyl aluminum hydride in tetrahydrofuran as a solvent produces 0.042 mols of diphenylsilane and only 0.006 mol of diphenylchlorosilane. Thus, the patent teaches that one cannot obtain significant yields of $R_2SiHCl$ compounds by merely using one-half the amount of AlH needed to reduce the total amount of chlorine in $R_2SiCl_2$. It would certainly be expected from the patent that $R_2Si(OR')_2$ would behave the same since alkoxy and halogen are made equivalent.

It is generally known in the art that silicon-bonded halogen is far more reactive than silicon-bonded alkoxy groups toward organometallic compounds in general. For example, Eaborn, "Organosilicon Compounds," pages 12 and 30 show that Grignard reagents and sodium alkyls will react with chloroalkoxysilanes to replace the chlorine in preference to the alkoxy group. This, dichlorodiethoxysilane can be reacted with a methyl Grignard reagent to produce the dimethyldiethoxysilane. The publication also shows on page 32, that alkyl aluminum compounds, in general, will react with halosilanes to establish SiC bonds and thereby teaches the equivalence of aluminum alkyls to Grignard reagents and alkali metal alkyls. This is also shown in U.S. Pat. Nos. 2,403,370.

It is further shown on page 197 of Eaborn, that lithium hydride will react with diethyldichlorosilane or diethyl diethoxysilane to produce diethylsilane. This is the teaching that the metal hydrides react, in general, according to the way in which organometallic compounds react.

On the bases of these teachings one would expect that in a competitive reaction between a halogen on silicon and an alkoxy group on silicon with respect to aluminum hydrides, the halogen would be preferentially replaced by hydrogen. There is nothing in U.S. Pat No. 2,857,414 or French Pat. 1,499,032 to rebut this presumption. It is therefore most unexpected that applicant has found under the conditions hereinafter shown the alkoxy group is preferentially replaced with respect to halogen atoms.

It is an object of this invention to provide a commercially feasible method for preparing silanes having one hydrogen and one or two chlorine atoms per molecule.

This invention relates to a method of preparing silanes by reacting an alkoxysilane with (1) $R''_2AlH$ employing (2) an aliphatic or cycloaliphatic ether, boiling above the silane product, in which there is no carbon-carbon multiple bonds between the carbon atoms, alpha, beta or gamma to the oxygen, in which no more than one carbon atom alpha- to the oxygen is attached to two or more carbon atoms and in which either there is no more than one oxygen atom attached to any one carbon atom, in which process the improvement comprising (A) reacting (1) with (3) a silane of the formula $R_x Si(OR')Cl_{3-x}$ in the presence of (2) during the reaction or (B) reacting (1) and (3) at a temperature not greater than 25° C. and thereafter adding (2) to the reaction mixture and distilling the mixture to separate the desired products, whereby silanes of the formula $R_x SiHCl_{3-x}$ are obtained as the major product in which R is a hydrocarbon or a halo-hydrocarbon radical, the total number of carbon atoms in the R groups being no more than 13, R' is methyl or ethyl, R'' is an alkyl radical of no more than 18 carbon atoms, and x is 1 or 2, and in both (A) and (B) there being about 1 or less mol of (1) per mol of OR' and (2) being present in the amount of at least 5 mol percent based on the mols of (1).

In carrying out variation (A) of the present invention one reacts the chlorosilane (3) with the dialkyl aluminum hydride (1) in the presence of the ether (2). One can mix the ether either with the chlorosilane or with the aluminum hydride, or one can mix the three materials simultaneously. In all cases better yields are obtained when vigorous agitation or mixing is carried out during the reaction of the hydrides with the alkoxysilanes. This is particularly true when less than 0.5 mol of ether per mol of AlH is used. The reaction can be carried out at temperature from −40° to a temperature below that at which serious decomposition of the desired products occur (preferably from 10° to 70° C.). After the reaction is complete the desired hydrochlorosilanes are separated from the reaction mixture in any convenient manner, such as by distillation. As long as the ether is present during the separation the temperature at this stage is not critical. The advantage of having the ether present is that one can carry out the distillation without having to resort to extremely low pressures and low temperature. This has some advantages, particularly in commercial operation on large scale.

In both variations (A) and (B) the ethers employed in this invention should be aliphatic or cycloaliphatic ethers, not including acetals, boiling above the boiling point of the desired silane products in which ethers there is no carbon-carbon multiple bond between the carbon atoms alpha, beta and gamma to the oxygen. This means that the ethers do not contain configurations such as $OC^1 \times C$, $OC \times C$, $OCC \times C$, $OC \times CC$ or $OC \times C \times C$. However, the ether can contain aliphatic unsaturation further removed from the oxygen such as the configuration

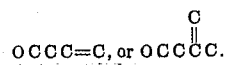

Furthermore, only one of the carbon atoms alpha to the oxygen can be branched. Thus, the ethers cannot have the configuration

but include ethers having the configuration

The term aliphatic ether is meant to include all ethers otherwise defined herein, in which the oxygen atom is attached to an aliphatic carbon. Thus, the term includes aralkyl ethers having the configuration, for example,

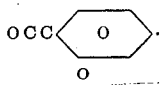

As can be seen from the above ethers employed in this invention can be linear or cyclic. Specific examples of aliphatic ethers which are operative herein are isobutyl methyl ether, isopropyl ethyl ether, propyl ethyl ether, ethyl octadecyl ether, dipropyl ether, dibutyl ether, dihexyl ether, ethyl hexyl ether, cyclohexyl methyl ether, dipentyl ether, beta-phenylethyl methyl ether; aliphatic ethers having more than one oxygen such as the dimethyl ether of ethylene glycol, the diethyl ether of diethylene glycol and the dimethyl ether of propylene glycol; and cycloaliphatic ethers such as 1,4 dioxane, tetrahydrofuran, tetrahydropyran, dihydroisobenzofuran.

The starting silanes employed in this invention are those which have one ethoxy or one methoxy group on the silicon atom and also either one or two chlorine atoms attached to the silicon. The remaining valences of the silicon atoms are satisfied by either one or two R groups. The total number of carbon atoms in the R group for any one silane is no more than 13, that is xenyl methyl chloro ethoxy silane is included, but not dixenyl chloro ethoxy silane. R is any hydrocarbon radical such as alkyl radicals such as methyl, ethyl, propyl, or tridecyl; any alkenyl radical such as vinyl, allyl or hexenyl; any cycloaliphatic hydrocarbon radical such as cyclopentyl, cyclohexyl or cyclohexenyl; any aromatic hydrocarbon radical such as phenyl, xenyl, tolyl, beta-phenylethyl or beta-phenylpropyl; or any halohydrocarbon radical such as 3,3,3-trifluoropropyl, chloromethyl, chlorophenyl, chlorocyclohexyl or chlorotolyl.

If desired, the starting silane can contain silanes having no alkoxy groups on the silicon such as $R_2SiCl_2$ or $R_3SiCl$. When conditions (A) and (B) are observed these chlorosilanes will not react appreciably with the aluminum hydride as long as the proportion of the latter does not exceed appreciably the concentration of $R_xSi(OR')Cl_{3-x}$.

The dialkyl aluminum hydrides employed in this invention are materials of commerce and can be any of those in which the alkyl radical has no more than 18 carbon atoms such as methyl, ethyl, propyl, isobutyl, hexyl, isohexyl, or octadecyl. The R'' groups on the aluminum can be the same or different.

Variation (B) of this invention is carried out by conducting the reaction of the chloroalkoxysilane and the dialkyl aluminum hydride at a temperature at or below 25° C. When this reaction is complete the ether is then added and the product is distilled at temperature, if desired, above 25° C. It is best to add the ether as soon after completion of the reaction as possible, particularly when the silane contains an aryl Si bond. In any event the temperature is best kept at 25° C. or below until the ether is added. The distillation temperature is not critical so long as it is below the decomposition temperature of the desired product.

In carrying out the reaction of this invention one can employ other types of solvents in addition to ethers. For example, the dialkyl aluminum hydride can be dissolved in hydrocarbon solvents such as toluene, or hexane, and then the ether is added. The alkoxy silane can also be dissolved in such solvents.

The hydrosilanes prepared by the method of this invention are useful as water repellents and as intermediates in preparation of various organosilicon polymers.

The following examples are illustrative only and should not be construed as limiting the invention which is properly delineated in the appended claims.

Examples 1 to 7 illustrate variation (A) of the instant invention.

EXAMPLE 1

0.2 mol of diisobutyl aluminum hydride is 133 ml. of toluene was added by gravity feed over a period of 5 minutes, to a solution of 25 g. (0.2 mol) of dimethyl chloro methoxy silane dissolved in 25 ml. of 1,4-dioxane at a temperature of 70° to 100° C. Continuous distillation of the affluent gave 13.2 g. (70 percent yield) of dimethylmono chlorosilane and only 1.84 g. of dimethyl silane.

EXAMPLE 2

0.2 mol of diisobutyl aluminum hydride dissolved in 133 ml. of toluene was added by gravity feed over a period of 1 hour to 25 g. of dimethyl chloro methoxy silane dissolved in 25 ml. of 1,4-dioxane at a temperature of 70° to 100° C. The procedure produced a 75 percent yield of dimethyl monochloro silane and a 25 percent yield of dimethylsilane.

EXAMPLE 3

The procedure of example 2 was repeated except that vigorous mixing of the ingredients was provided. The yield of dimethylmonochlorosilane was 95 percent.

EXAMPLE 4

0.0015 mol of 1,4-dioxane was added to 0.0015 mol of diisobutyl aluminum hydride and this solution was added to a mixture of 0.0015 mol of 3,3,3,-trifluoropropyl methyl chloro methoxysilane and 0.0015 mol of 3,3,3-trifluoropropylmethylchlorosilane. Thorough mixing obtained during the addition. The yield of 3,3,3-trifluoropropylmethylchlorosilane was 96 percent of theory leaving the 3,3,3-trifluoropropyl methyl dichlorosilane unreacted. The separation was made on a vapor phase chromatograph.

EXAMPLE 5

This example and the previous one illustrate the fact that one can employ mixtures of chloroalkoxysilanes and dichlorosilanes in this reaction and that the chloroalkoxysilane will react in preference to the dichlorosilanes. Thus, one can employ crude mixtures of alkoxychlorosilanes and chlorosilanes in the reactions of this invention.

An equimolar mixture of 1,4-dioxane and diisobutyl aluminum hydride was added to a mixture of 21 percent methyldichloromethoxysilane and 79 percent methyltrichlorosilane at −23° C., after the reaction was complete the volatiles were removed by vacuum to give a 80 percent yield of methyldichlorosilane based on the starting methyl dichloro methoxy silane.

EXAMPLE 6

0.018 mol of diisobutyl aluminum hydride dissolved in 12 ml. of benzene was combined with 0.024 mol of dihexyl ether. The solution was added to 0.018 mol of phenyl methyl chloro methoxy silane. The mixture was distilled at 50 mm. mercury to give phenyl methyl monochloro silane boiling 95° to 100° C. at 50 mm. in amount of a 95 percent yield of the desired product.

EXAMPLE 7

A solution of 0.015 mol of diisobutyl aluminum hydride in 10 ml. of toluene was mixed with 0.0015 mol of tetrahydrofuran and the solution was mixed with 0.015 mol of dimethyl chloro methoxy silane at 50° C. by simultaneously injecting the liquids into a mixing chamber with sufficient force to obtain instant mixing. Simultaneously the composition was distilled at atmospheric pressure affording dimethylmonochlorosilane in amount of 91 percent of the theoretical yield.

The following examples illustrate the second variation of this invention.

EXAMPLE 8

This example shows the effect of the absence of the ether during the distillation of the product. A 1.5 molar solution of diisobutyl aluminum hydride in toluene was added dropwise with mechanical stirring at 25° C. to an equal molar amount of dimethyl chloro methoxy silane. The yield of dimethylmonochlorosilane at this point was 52 percent as determined by vapor phase chromatography. Distillation of the product at atmospheric pressure gave a 5 percent yield of methylmonochlorosilanes.

EXAMPLE 9

Repeating the procedure of example 8, diisobutyl aluminum hydride was added to dimethyl chloro methoxy silane at 25° C. Tetrahydrofuran was then added to the mixture in the amount of 50 mol percent based on the amount of the diisobutyl aluminum hydride. The mixture was then distilled at atmospheric pressure and the yield of dimethylmonochlorosilane was 89 percent of theory.

EXAMPLE 10

A 1.5 molar toluene solution of diisobutyl aluminum hydride was added to an equal molar amount of dimethyl chloro methoxy silane at 25° C. by injecting the two liquids simultaneously into a chamber with sufficient force to obtain instant mixing. Tetrahydrofuran was then added to the reaction mixture in amount of 10 mol percent based on the weight of the isobutyl aluminum hydride. The mixture was distilled at atmospheric pressure and the yield of the desired dimethylmonochlorosilane was 96 percent of theory.

EXAMPLE 11

The mixing procedure of example 10 was employed herein. 0.015 mol of diisobutyl aluminum hydride in 10 ml. of toluene was mixed at 25° C. with a mixture of 0.015 mol of dimethyl chloro methoxy silane and 0.015 mol of dimethyldichlorosilane. Tetrahydrofuran was added to the reaction mixture in the amount of 10 mol percent based on the amount of diiosbutyl aluminum hydride. The mixture was distilled at atmospheric pressure and the amount of dimethylmonochlorosilane obtained was equal to 94 percent theory based on the starting amount of dimethyl chloro methoxy silane.

This example illustrates that variation (2) can also be employed with mixtures of chloro methoxy silanes and dichlorosilanes.

EXAMPLE 12

A good yield of dimethylmonochlorosilane is obtained when dimethyl chloro ethoxy silane is employed in the procedure of examples 3 and 7.

EXAMPLE 13

When the following methoxy chloro silanes are reacted with diisobutyl aluminum hydride in accordance with the process of example 3 using the following ethers, the following chlorosilanes are obtained.

EXAMPLE 14

When the following aluminum hydrides are used in the process of example 3, equivalent results are obtained,
diethyl aluminum hydride
ethyl butyl aluminum hydride
didecyl aluminum hydride
dipropyl aluminum hydride.

EXAMPLE 15

The following ethers can be substituted in the procedure of example 3,
$CH_3OCH_2CH_2OCH_3$
isopropyl ethyl ether
beta-phenylethyl methyl ether
cyclohexyl methyl ether
dodecyl methyl ether
6-methoxy hexene-1.

That which is claimed is:

1. In the method of preparing silanes by reacting alkoxysilanes with
   1. $R''_2AlH$ employing
   2. an aliphatic or cycloaliphatic ether, boiling above the silane product, in which there is no carbon-carbon multiple bonds between the carbon atoms alpha–, beta– and gamma– to the oxygen, in which no more than one carbon atom alpha to the oxygen is attached to two or more carbon atoms and in which there is no more than one oxygen atom attached to any one carbon atom, the improvements comprising
   (A) reacting (1) with
   3. a silane of the formula $R_xSi(OR')Cl_{3-x}$ in which process (2) is present during the reaction of (1) and (3), or (B) reacting (1) and (3) at a temperature not greater than 25° C. and thereafter adding (2) to the reaction mixture and distilling the mixture to separate the desired product, whereby silanes of the formula $R_xSiHCl_{3-x}$ are obtained as the major reaction product in which
   R is a hydrocarbon or a halohydrocarbon radical, the total number of carbon atoms in the R groups being no more than 13,
   R' is methyl or ethyl,
   R'' is an alkyl radical of no more than 18 carbon atoms, and
   x is 1 or 2, and
   in both (A) and (B) there being about 1 or less mols of (1) per mol of OR' and (2) being present in amount of at least 5 mol percent based on the mols of (1).

2. The process of claim 1 in which (1) is diisobutyl aluminum hydride, (2) is 1,4-dioxane and (3) is dimethyl chloro methoxy silane.

3. The process of claim 1 in which (1) is diisobutyl aluminum hydride, (2) is dihexyl ether and (3) is 3,3,3-trifluoropropyl methyl chloro methoxy silane.

4. The process of claim 1 in which (1) is diisobutyl aluminum hydride, (2) is dihexyl ether and (3) is phenyl methyl chloro methoxy silane.

5. The process of claim 1 in which (2) is present during the reaction of (1) and (3).

6. The process of claim 5 in which (1) is diisobutyl aluminum hydride, (2) is 1,4-dioxane and (3) is dimethyl chloro methoxy silane.

| Chloro methoxy silane | Ether | Chloro silane |
|---|---|---|
| $(C_{13}H_{27})Si(OCH_3)Cl_2$ | 2,2'-diphenyl-diethyl ether * | $(C_{13}H_{27})SiHCl_2$ |
| $CH_2=CHSi(OCH_3)Cl_2$ | Dihexyl ether | $CH_2=CHSiHCl_2$ |
| $(ClC_6H_4)_2Si(OCH_3)Cl$ | 2,2'-diphenyl-diethyl ether | $(ClC_6H_4)_2SiHCl$ |
| $C_6H_5\overset{CH_3}{\underset{|}{C}H}CH_2Si(OCH_3)Cl_2$ | do | $C_6H_5\overset{CH_3}{\underset{|}{C}H}CH_2SiHCl_2$ |
| $Br(CH_2)_3Si(OCH_3)Cl_2$ | do | $Br(CH_2)_3SiHCl_2$ |
| $C_6H_{11}Si(OCH_3)Cl_2$ | do | $C_6H_{11}SiHCl_2$ |
| $(CH_3C_6H_4)(C_2H_5)Si(OCH_3)Cl$ | do | $(CH_3C_6H_4)(C_2H_5)SiHCl$ |
| $-Si(OCH_3)Cl_2$ | do | $-SiHCl_2$ |

*$C_6H_5CH_2CH_2OCH_2CH_2C_6H_5$.